US012744723B2

(12) United States Patent
Montilla

(10) Patent No.: US 12,744,723 B2
(45) Date of Patent: Sep. 22, 2026

(54) TELEPHONY DELAY TOLERANT NETWORK SYSTEM

(71) Applicant: Alberto A. Montilla, Allen, TX (US)

(72) Inventor: Alberto A. Montilla, Allen, TX (US)

( * ) Notice: Subject to any disclaimer, the term of this patent is extended or adjusted under 35 U.S.C. 154(b) by 417 days.

(21) Appl. No.: 18/131,579

(22) Filed: Apr. 6, 2023

(65) Prior Publication Data

US 2024/0340232 A1 Oct. 10, 2024

(51) Int. Cl.
*H04L 45/121* (2022.01)
*H04L 67/06* (2022.01)

(52) U.S. Cl.
CPC ............ *H04L 45/121* (2013.01); *H04L 67/06* (2013.01)

(58) Field of Classification Search
CPC ....... H04W 88/04; H04W 24/10; H04W 8/22; H04L 43/16; H04L 43/0894; H04L 61/59; H04L 61/2521
See application file for complete search history.

(56) References Cited

U.S. PATENT DOCUMENTS 8,149,716 B2 4/2012 Ramanathan
8,611,213 B1 * 12/2013 Lagar-Cavilla ... H04W 52/0216 455/445
8,954,207 B1 * 2/2015 Anzalone .............. G01C 21/24 701/13
9,054,912 B2 6/2015 Katis
9,178,916 B2 11/2015 Katis
10,892,946 B2 1/2021 Correia E Costa
11,044,311 B2 6/2021 Condeixa
2010/0265951 A1 * 10/2010 Fujita .................... H04L 45/123 370/392
2013/0107754 A1 5/2013 Perreault
2014/0003730 A1 1/2014 Tanaka
2016/0205030 A1 * 7/2016 Kudou .................... H04L 47/30 370/310
2017/0164266 A1 6/2017 Domaratsky
2017/0346750 A1 * 11/2017 Wang .................... H04L 1/0019
2019/0020701 A1 * 1/2019 Barritt .............. H04N 21/47202
2019/0191326 A1 * 6/2019 Tsuji ..................... H04W 88/04

FOREIGN PATENT DOCUMENTS

CN 102883397 A 1/2013
TW 201532393 A 8/2015
WO WO2016022038 A1 2/2016

* cited by examiner

*Primary Examiner* — Mahran Y Abu Roumi
(74) *Attorney, Agent, or Firm* — Alexis Saenz

(57) ABSTRACT

Communication through telephone networks (including Public Switched Telephone Networks, Public Land Mobile Networks and Private Branch Exchanges) use a hardware device and/or a software client. Systems and methods of the subject technology include a Telephone DTN connector, which is an apparatus that is connected to the Telephone Networks and to Delay and Disruption Tolerant Networks (DTN) that includes methods to locate, process, forward and receive requests and media from users in the telephone networks through the DTN Network. Some embodiments connect users (or software applications) located in outer space (for example Earth Low Earth Orbit, Moon, Mars) with a telephony network. A Telephone DTN instance, located at the remote outer space destination, includes methods to locate, process, forward and receive the requests and media to the users' (or software applications') telephone devices and clients (including the Telephone DTN Web Client) in outer space.

20 Claims, 12 Drawing Sheets

TELEPHONY DELAY TOLERANT NETWORK SYSTEM

CROSS-REFERENCE TO RELATED APPLICATIONS

None.

FIELD

The subject disclosure relates to network systems, and more particularly, to a telephony delay tolerant network system.

BACKGROUND

Telephone networks, public and private, allow users and device applications to connect and communicate with voice, messaging, video and for transferring files. Traditional telephone networks are designed to assume a static location of a user, as defined, and mapped from their public identifier, the telephone number. The Public Switched Telephone Network (PSTN) and the Private Branch Exchanges (PBX) are examples of public and private telephone networks. With mobile telephone networks, users have the possibility to connect and communicate while on the move. These networks have been extended with functionality that allows the system to locate a network user/device and route requests to the appropriate network location. The Public Land Mobile Network (PLMN) is an example of a public mobile network.

Protocols and systems of these networks have been designed for its use on Earth and Earth vicinity (Earth Low Earth Orbit as example), where the signal propagation delays, that is, the time it takes for an electronic, radio or optical signal to travel from origin to destination is in the order of milliseconds to hundreds of milliseconds.

With humanity (and associated machines) expanding to outer space, there is a need to expand systems originally designed for Earth to other interplanetary locations, including, but not limited to, the Moon, Mars, and other orbits and planets.

At Interplanetary distances, communications experience signal propagation delays in the order or seconds (for example Earth to Moon), Minutes (for example Earth to Mars), and hours (other planets in the solar system). In addition, due to the initial lack of infrastructure and the movements and rotation of planets, a continuous link connecting planets is not guaranteed and frequent disruptions within communication links are expected. In these scenarios, networks (and their underlying protocols) designed for Earth can suffer significant performance delays to the point that they become unusable.

SUMMARY

In one aspect of the disclosure, a computer product for connecting telephony calls to a Delay and/or Disruption Tolerant Network (DTN) is disclosed. The computer program product comprises a non-transitory computer readable storage medium having computer readable program code embodied therewith. The computer readable program code is configured, when executed by a processor, to: receive a telephony network formatted signal from a telephony network. A telephony protocol being used by the telephony network is identified. The telephony network formatted signal is translated from the telephony protocol to a DTN protocol for transmission to a targeted DTN side end device or client. A DTN associated with the targeted DTN end device or client is identified. The translated telephony formatted signal is forwarded from the telephony network to the targeted DTN end device or client. Translated DTN formatted signals from the targeted DTN end device or client are forwarded to a targeted telephony side end device or client in the telephony network.

In another aspect of the disclosure, a method of connecting telephony calls to a Delay and/or Disruption Tolerant Network (DTN) is disclosed. The method includes receiving a telephony network formatted signal from a telephony network. A telephony protocol being used by the telephony network is identified. The telephony network formatted signal is translated from the telephony protocol to a DTN protocol for transmission to a targeted DTN side end device or client. A DTN associated with the targeted DTN end device or client is identified. The translated telephony formatted signal is forwarded from the telephony network to the targeted DTN end device or client. Translated DTN formatted signals from the targeted DTN end device or client are forwarded to a targeted telephony side end device or client in the telephony network.

In still yet another aspect of the disclosure, a computer server for connecting telephony users through a Delay and/or Disruption Tolerant Network (DTN) is disclosed. The computer server includes one or more network connections, one or more computer readable storage media, a processor coupled to the one or more network connections and coupled to the one or more computer readable storage media, and a computer program product comprising program instructions collectively stored on the one or more computer readable storage media. The program instructions include receiving a telephony network formatted signal from a telephony network. A telephony protocol being used by the telephony network is identified. The telephony network formatted signal is translated from the telephony protocol to a DTN protocol for transmission to a targeted DTN side end device or client. A DTN associated with the targeted DTN end device or client is identified. The translated telephony formatted signal is forwarded from the telephony network to the targeted DTN end device or client. Translated DTN formatted signals from the targeted DTN end device or client are forwarded to a targeted telephony side end device or client in the telephony network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
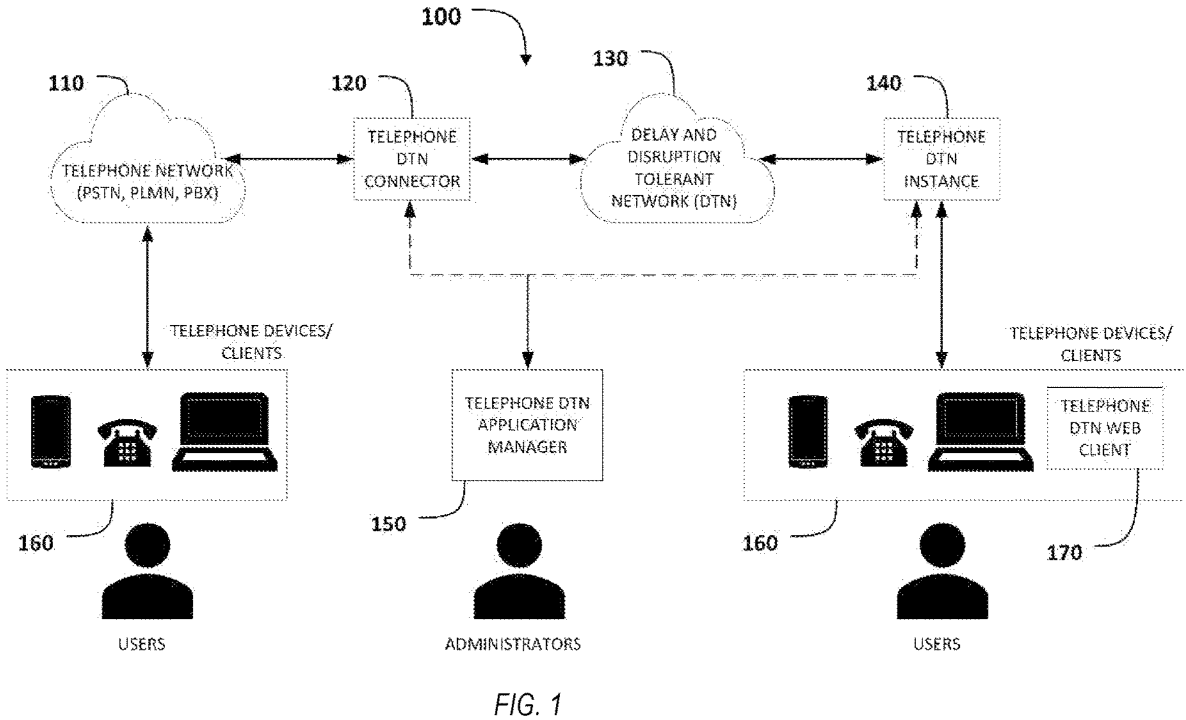
FIG. 1 is a block diagram of a network environment, according to an example embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Overview

In general, embodiments of the subject technology provide improvements in communications systems. A Delay and/or Disruption Tolerant Network (DTN) is integrated with a telephone network which, as may be appreciated, addresses situations that may experience delays and disruptions when a telephone device is present in a communication. "Delay" as used herein may refer to the interval of time between the origination of a signal and the signal reaching its destination due to distance or other factor slowing down the connection, for example, re-routing, temporary unavailability, signal interference, etc. For example, the communication of telephone users, devices, or applications on Earth with users, devices, or applications in outer space through a DTN provides the main benefit of allowing reliable communications of users in outer space with any user at Interplanetary distances, including those on Earth. Embodiments may include a Telephone DTN Connector to register users in the DTN. The DTN connector and a method of use may associate users' identities in the telephone network with forwarding information in the DTN. The Telephone DTN Connector may connect users in the telephone network with users connected with the DTN. One example of a method under the subject technology includes, upon receiving a request to communicate to a user, determining the location of the user within the DTN, determining the method of communications based on the characteristics of the contact within the DTN network, including delay or distance, whether the connection is currently in contact/available, the duration of the contact, and the availability of other methods of communications. The method provides for the forwarding of signaling, media and metadata between the users, including the media types used in the telephone networks including real-time and non-real time audio, video, text, file transfer, using calling, messaging, streaming and broadcast services, among others. Embodiments may include a Telephone DTN Instance which may register users in the DTN and may associate the users' identities in the DTN and their forwarding information to the telephone network.

In another embodiment, the Telephone DTN Instance may communicate users connected with the DTN with users in the telephone network. The method includes, upon receiving a request to communicate to a user, determining the location of the user within the DTN, determining the method of communications based on the characteristics of the contact within the DTN network, including delay (or distance), whether the connection is currently in contact/available, the duration of the contact, and the availability of other methods of communications. The method provides for the forwarding of signaling, media and metadata between the users, including the media types used in the telephone networks including real-time and non-real time audio, video, text, file transfer, using calling, messaging, streaming and broadcast services, among others.

Example Embodiments

Referring now to FIG. 1, a system 100 for connecting telephony entities to a DTN is shown according to an embodiment. Users in a telephone network 110 (using telephony-based devices or clients 160) communicate with other users in the telephone network using telephone devices/clients 160. In some embodiments, a telephone DTN web client 170 may be used as the end device. The telephone network 110 may use multiple protocols including HTTP, HTTPS, SIP, or H.323 to signal between these devices/clients to create or manage sessions to, for example, make a call, send a message, send a file, or for signaling events. The telephone network 110 may be an Earth-bound side of the system, while the DTN side of the system may be extraterrestrial. While not shown, it should be understood that the transition from the telephony network 110 to the DTN 130 may be wired, wireless, or some combination of wired and wireless elements.

Embodiments may include a telephone DTN connector 120 connecting the telephone network 110 to a DTN 130. In one embodiment, the DTN connector 120 may be a software module resident on a computing device that is connected between, or a part of, either the telephone network 110 or the DTN 130. Some embodiments may be a device that includes input and output ports connected to the DTN 130. As a device, the DTN connector 120 may include a programmed circuit board with software or firmware configured to process and transmit data messages to and from the DTN 130. In some device embodiments, the DTN connector 120 may incorporate a computing device that runs the software processes associated with the interface between the telephony to DTN side of the architecture. The DTN connector identifies a telephony protocol being used by the telephony network to send the call, message, file, etc. In some embodiments, return signals from the DTN side of the communication may be transmitted to the original caller using the identified telephony protocol.

Users may communicate with each other through the telephone DTN connector 120 and DTN 130 by creating a telephone DTN instance 140. Users connected to the telephone DTN instance 140 use telephone devices/clients 160 including in some instances the telephone DTN web client 170. In some embodiments, the DTN instance 140 may be a software module that is operated by a computing device that is either present in the DTN 130 or in the DTN side telephone devices/clients 160. The DTN instance 140 may be instantiated on the fly as a result of a DTN side end user's request, or in response to the DTN side end user device/client 160 receiving a ping or other message checking for availability from the DTN network 130.

Some embodiments may include a telephone DTN application manager 150. The DTN application manager 150 may be a software module resident on a computing device connected to the DTN 130 through the DTN connector 120 and DTN instance 140. The DTN application manager 150 supports the creation and management of the configuration of the Telephone DTN nodes (DTN instances 140), including the network overlay, telephone numbers, etc. Communication methods include making a call, sending a message, and transferring a file with a message. Examples of media transmitted within a communication includes audio, video, text, and digital media. The telephone DTN connector 120, the telephone DTN instance 140, and the telephone devices/clients 160 connected to the DTN 130 may be managed by the administrators using the telephone DTN application manager 150.

In some embodiments, the DTN connector 120, the DTN instance 140, and/or the DTN application manager 150 may be software modules that are packaged together into one software application that is resident on different computing devices located at different points in the system 100. In some embodiments, a computing device receiving a message from another computing device in the system 100 may first recognize where in the network 100 the device is, based on the message received, and may perform instantiation of the next part of a process. For example, the overall software application may be on a computing device that is located between (or as an edge node of) the telephony network 110 and the DTN 130. Messages received at one of these points may identify that a message is either being sent to the DTN side or being received from the DTN side. Accordingly, translation and/or forwarding may be performed as necessary depending on the direction of the message. The software application may also be in a computing device within the DTN 130 and/or the DTN side end device 160 to provide the DTN instance 140. The computing device providing the telephone DTN application manager 150 functionality may be present anywhere in the system 100 so that administrative functions can be performed either on the telephony side or the DTN side.

Figure 2:
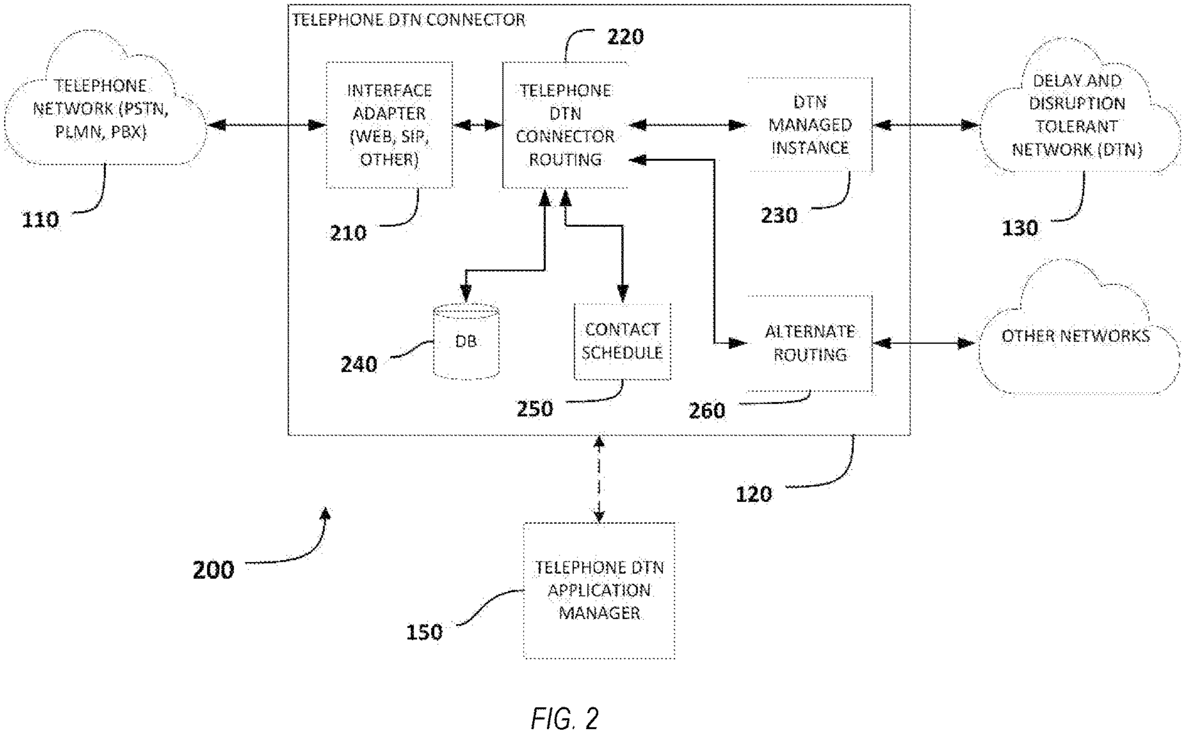
FIG. 2 is a block diagram depicting functions of a telephone DTN Connector, according to an example embodiment.

Referring now to FIG. 2, an example of the telephone DTN connector 120 is shown according to an embodiment. Embodiments of the telephone DTN connector 120 may be either a device, a software module, or a circuit of elements connected together to provide various functions for a DTN connection. The telephone DTN connector 120 may include an interface adapter 210 for connecting the telephone DTN connector 120 to a telephone network 110. A telephone DTN connector routing module 220 in the telephone DTN connector 120 may route signals from the adapter interface 210 to other elements in the telephone DTN connector 120. In some embodiments, there may be an interface adapter instance for each protocol being used, to adapt to the DTN 130. This will translate protocols such as SIP, HTTP/HTTPS, WEBRTC, RTP AND GRPC (among others) on the telephone network side to the specific protocol on the DTN side. The telephone DTN connector routing module 220 will forward requests, responses and associated media between the associated networks depending on several factors, including for example, a contact schedule 250, a delay between the users, and the availability of routing options (represented by alternate routing module 260). As may be appreciated, routing based on one or more factors may improve communication when the users are separated by interplanetary distance. For example, if the telephony user is on Earth and the remote user is on Mars, the signal delay between them will be of many minutes. So rather than forcing the telephony user to wait for the delay to end, the communication may be scheduled and the telephone DTN connector 120 may select to route the communication through the DTN 130, provided there is an available route. A database (DB) 240 may store data associations that may be used in the system 100; for example, the association between telephone users and a DTN destination association used by telephone DTN connector methods. The contact schedule 250 may be used to obtain per-destination contact specific information which will assist the telephone DTN connector routing decisions. The DTN managed instance may be a DTN node that includes support for a bundle protocol (BP) and interfaces with the DTN 130. The alternate routing function in the module 260 may be used for the telephone DTN connector routing to route the request, responses, and media to other networks other than the DTN network. For example, if the node is 'live' or a contact exists to connect directly via, for example, telephony protocols, the alternate routing provided by the module 260 may provide the best way to reach the node. As may be appreciated, the alternate routing function of module 260 provides reliable earth-like communications (and is an improvement over) when compared against asynchronous reliable DTN communications.

Figure 3:
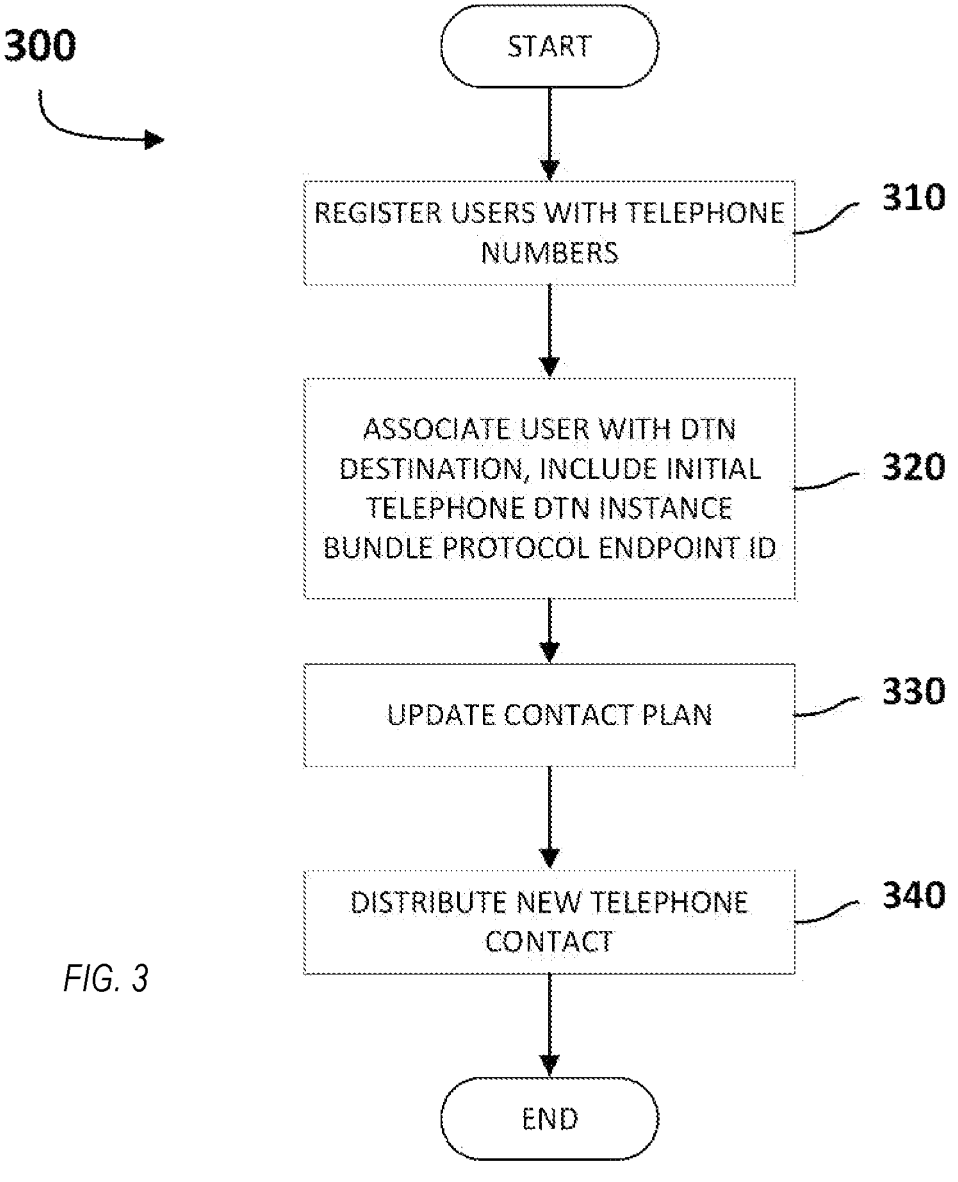
FIG. 3 is a flowchart of a method of performing registration and association of a remote telephone user with its DTN instance destination, according to an example embodiment.

FIG. 3 shows a method 300 to register and associate users with a DTN destination according to an embodiment. In one application, the DTN connector 120 is the element for registering and associating users with the DTN destination. The method 300 may start when the telephone DTN connector 120 receives a request to register users with telephone numbers. The request may contain target user identifiers (for example, at least a user's telephone number), and the DTN destination details, (including for example, the DTN bundle protocol endpoint ID). Using the identifiers, the DTN connector 120 registers 310 users and their associated telephone numbers. In some embodiments, the DTN connector 120 may associate 320 a user with a DTN destination. The association may include the DTN bundle protocol endpoint ID. The association between end user and destination of a call/message may be governed by the DTN application manager 150. Whether the association is stored as permanent or created for each call instance may be defined as a setting in the DTN application manager 150. Once this information is received, the telephone DTN connector 120 will use 330 the update contact plan to attempt to validate that there are available forwarding routes for the received endpoint ID. A distribute new telephone contact function may be used to distribute 340 the new telephone contact to other telephone DTN connector(s) and telephone DTN instance(s).

Figure 4:
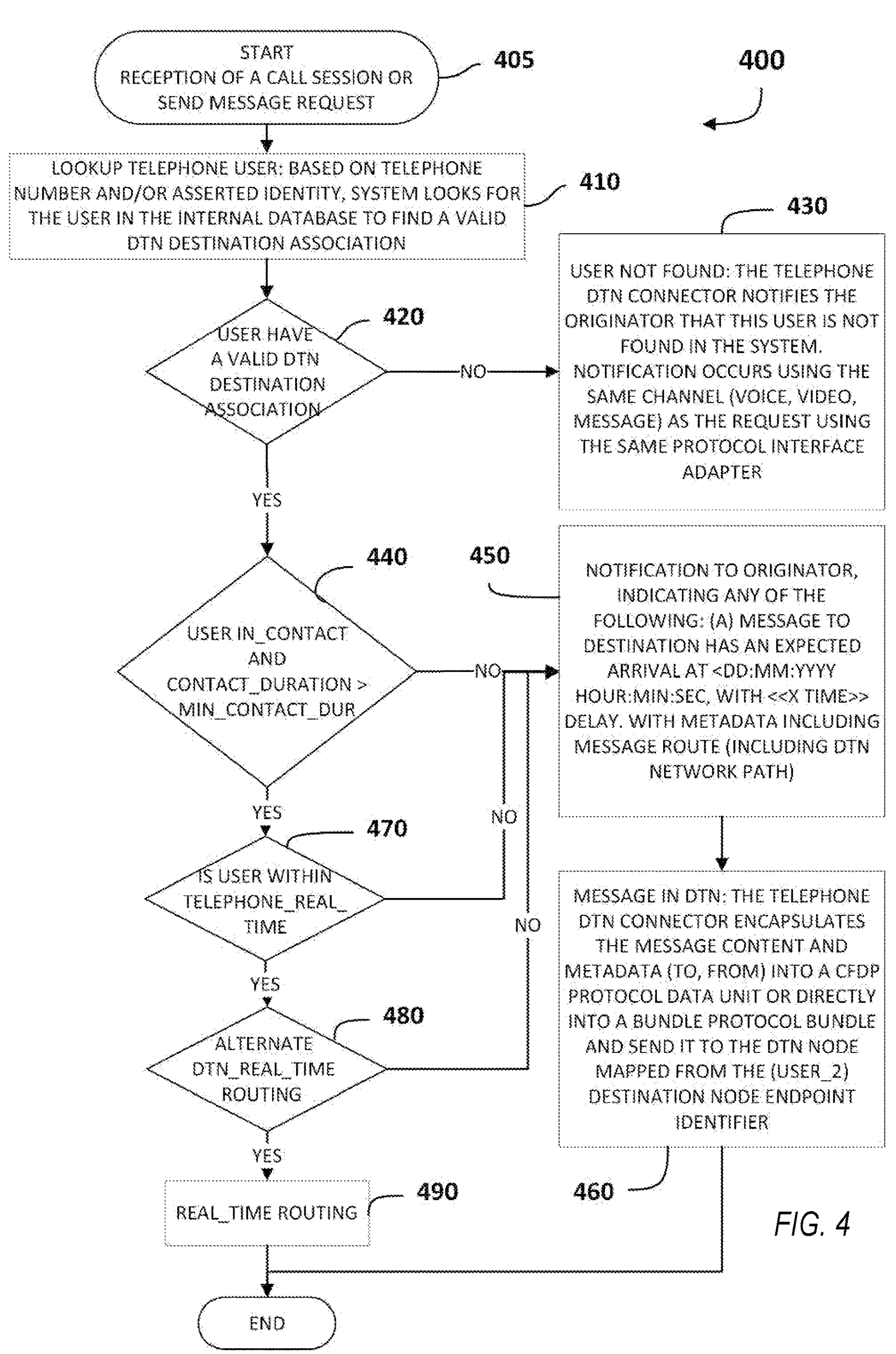
FIG. 4 is a flowchart of a method of performing location and forwarding of requests and media to a remote telephone user that is on a DTN destination, according to an example embodiment.

Referring now to FIG. 4, a method 400 (which may be used by the telephone DTN connector 120) to forward a request made by a user in a telephone network to a user in a DTN network is shown according to an embodiment. In the following description of steps, some references to a user's status is shown in parentheses (for example, "(not in_contact)", which represents the end user being called is currently unavailable or out of reach. Other statuses use a similar format and their meanings are included within the descriptions.

The method 400 starts 405 at reception of a call session (request to make a call) or to send a message and/or file. At reception of a telephony network formatted signal from a telephony network, a telephone DTN connector may lookup 410 the destination user details in the database to find a valid match with a valid DTN destination. A determination 420 of whether a user has a valid DTN destination association may be made. If a match is not found or a valid DTN destination for this user is not found, the telephone DTN connector notifies 430 the originator that this user is not found. As a security measure, the notification indicating the user is not found may withhold specific details, and/or may simply result in a failed connection to prevent inadvertently providing any sensitive information. This notification may occur using the same channel as the request by using the same protocol interface adapters. For users with a valid DTN destination, the telephone DTN connector will evaluate the contact plan details to determine 440 what type of communication to use. The telephone DTN connector may evaluate the destination user's contact details. For a destination user that is not in contact (not in_contact), or for a destination user in contact (in_contact) with a contact duration (contact_duration) less or equal than the minimum contact duration (min_contact_dur), or for destination user not within the telephony real time delay limits (telephone_real_time) (determination 470), and for destination user without a real time alternate route (alternate_DTN_real_time_routing) (determination 480), the telephone DTN connector decides to forward the request (and associated media) through the DTN. The DTN connector may notify 450 the originating user of the temporary unavailability of the recipient user by issuing one of two types of notification (however other types of notification may also be used): (a) for messaging requests (for example SMS), the telephone DTN connector replies to the originating user with a message indicating that the original message is expected arrive at the destination at a specific day and time of the day and the expected arrival delay. (b) for call requests, the telephone DTN connector connects the call with the originating user and informs the user the conversation will be interactive and asynchronous, indicating the expected arrival day and time at destination and the expected arrival delay, instructing the user to leave a voice message. In some embodiments, the DTN connector may indicate in a message associated with (telephone_real_time) whether the target recipient will be available in the future, so that users may be provided a future time they can expect to call and have available live telephony. The telephone DTN connector managed DTN instance module may then encapsulate 460 the data into a CFDP (CCSDS (consultative committee of space data systems) file delivery protocol) protocol data unit (PDU) or directly into a bundle protocol bundle and may send it to the DTN destination associated with the recipient destination user. For destination user in contact (in_contact), and with a contact duration (contact_duration) greater than the minimum contact duration (min_contact_dur) and within the telephony real time delay limits (telephone_real_time) and with a real time alternate route (alternate_DTN_real_time_routing), the telephone DTN connector will send 490 the request (and associated media) through the alternate real_time routing option.

Figure 5:
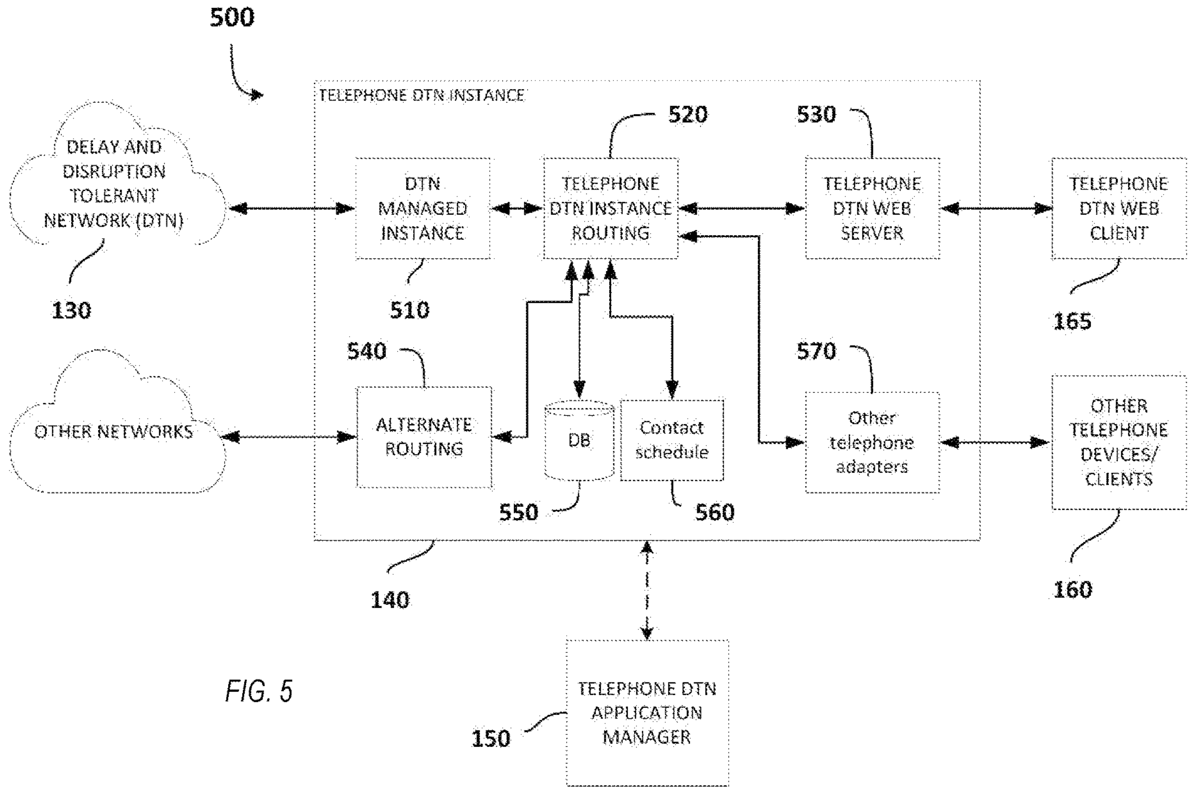
FIG. 5 is a block diagram depicting functions of telephone DTN Instance, according to an example embodiment.

Referring now to FIG. 5, an example of the telephone DTN instance 140 is shown along with examples of major functions. The DTN managed instance 510 may be a hardware DTN node (or software-based module that exists in a software application resident in the telephone DTN instance 140) that includes support for the bundle protocol and interfaces with the DTN 130. A telephone DTN instance routing module 520 may forward the requests, responses and associated media between the associated networks depending on several factors, including a contact schedule 560, a delay between the users and availability of routing options. An alternate routing module 540 may be used for the telephone DTN instance routing module 520 to route requests, responses, and media to other networks other than the DTN network 130. The database 550 may store the association information between telephone users and a default DTN connector association used by the telephone DTN instance methods. The contact schedule 560 may be used to obtain per-destination contact specific information which will assist the telephone DTN instance routing decisions. Some embodiments may include a telephone DTN web server 530 that may host a web service with a DTN telephony application used by end users to communicate via the telephone DTN web client. Some embodiments may include other telephone adapters 570 to adapt to other protocols used by the other telephone devices/clients. This will translate the specific protocol on the DTN side to the more traditional telephone protocols such as SIP, HTTP/HTTPS, WEBRTC, RTP AND GRPC (among others).

Figure 6:
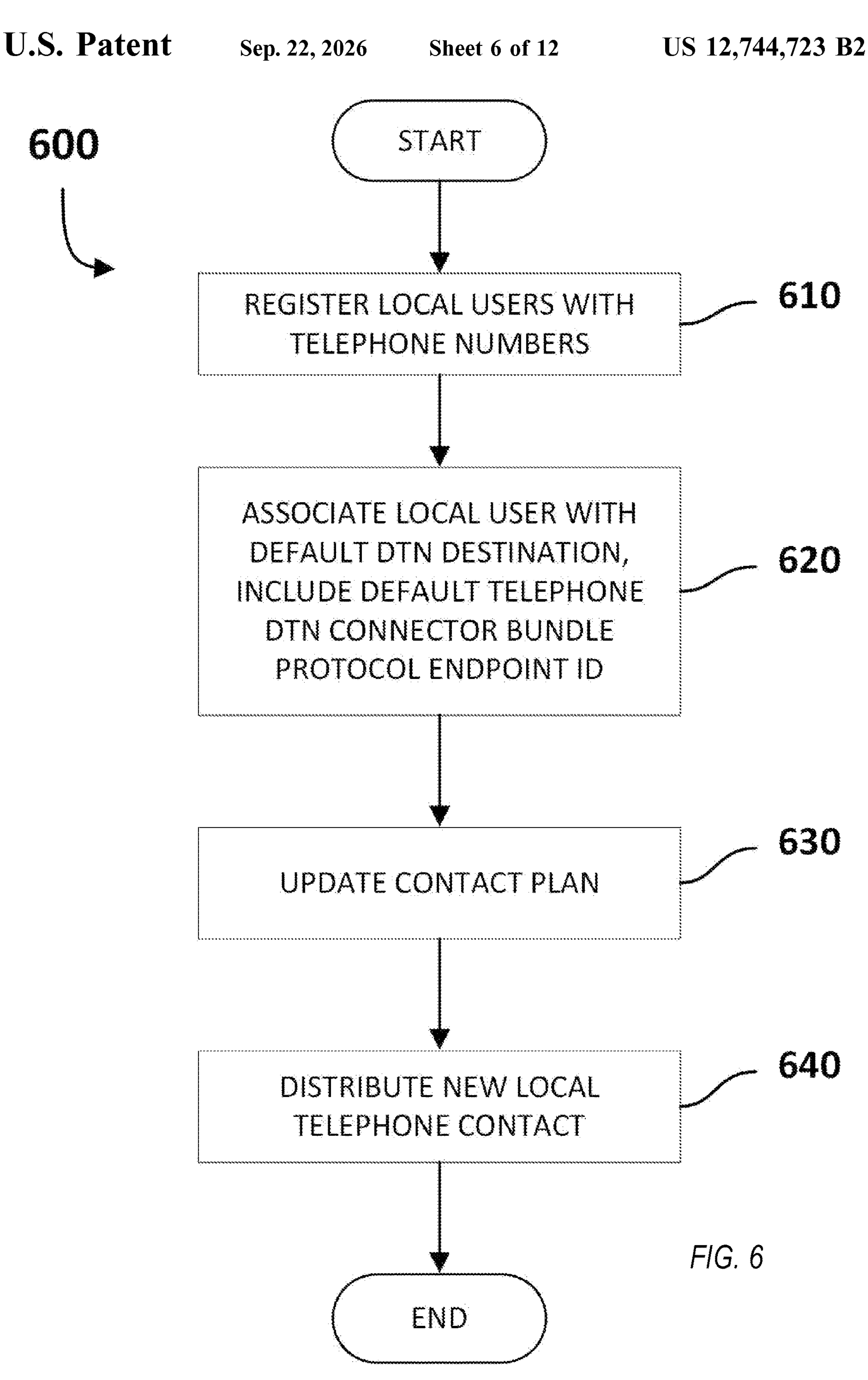
FIG. 6 is a flowchart of a method of performing registration and association of a local telephone user with its DTN Connector destination, according to an example embodiment.

FIG. 6 shows a method 600 which may be used by the telephone DTN instance 140 to register and associate local users with telephone numbers and a default DTN destination consistent with embodiments. The method 600 starts when the telephone DTN instance 140 receives a request to register local users with telephone numbers. The request contains the target user identifiers (including for example, the user's telephone number), and default DTN destination details, (including for example, the DTN bundle protocol endpoint ID). Using the identifiers, telephone DTN instance 140 registers 610 users and their associated telephone numbers. In some embodiments, telephone DTN instance 140 may associate 620 a user with a DTN destination. The association may include the DTN bundle protocol endpoint ID. Once this information is received, the telephone DTN instance 140 may update 630 a contact plan to attempt to validate that there are available forwarding routes for the received endpoint ID. The telephone DTN instance 140 may distribute 640 the new local telephone contact information to other telephone DTN connector(s) and telephone DTN instance(s).

Figure 7:
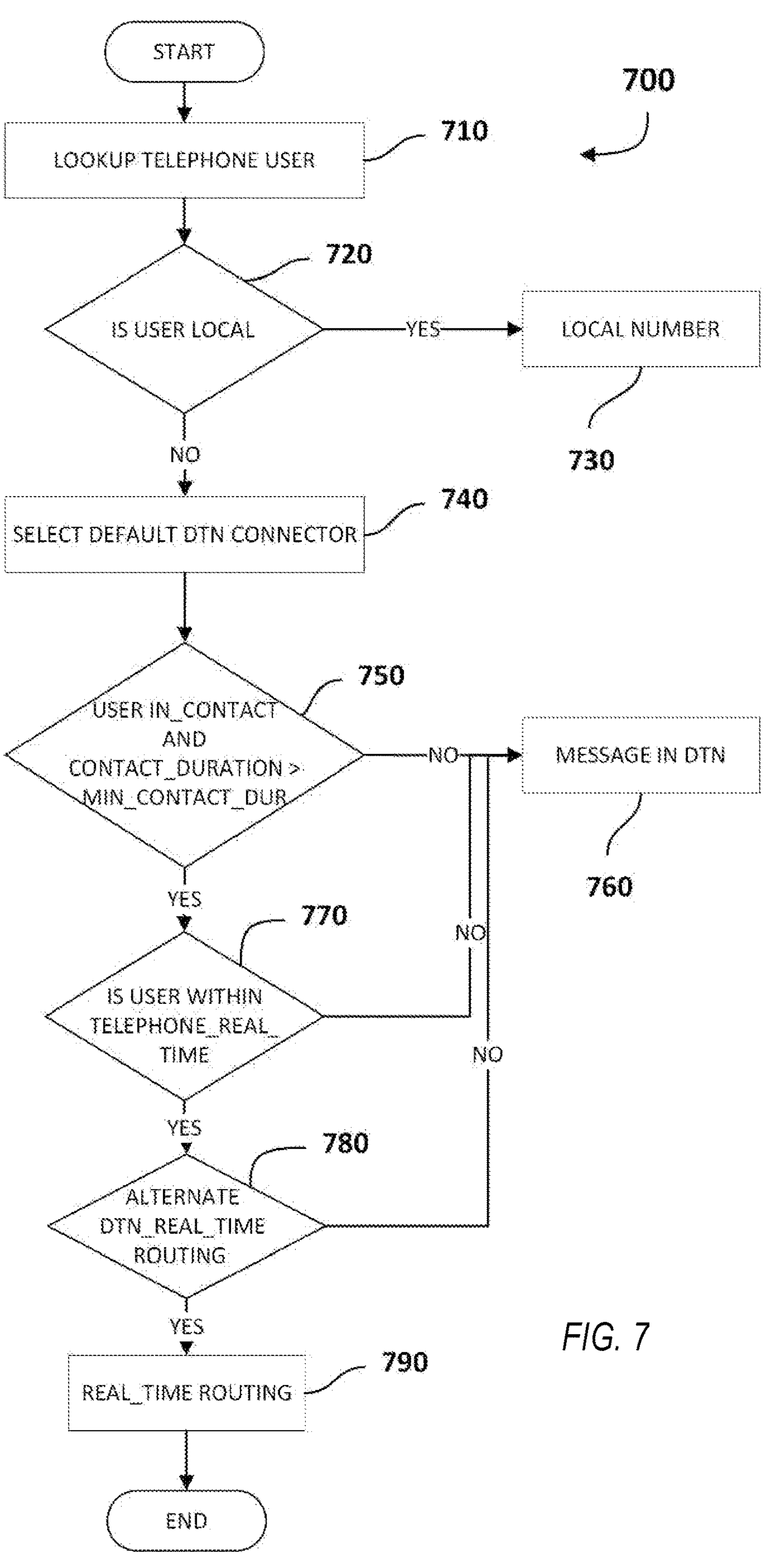
FIG. 7 is a flowchart of a method of performing location and forwarding of requests and media from a local telephone user that is on a DTN destination, according to an example embodiment.

FIG. 7 shows a method 700 (which may be used by the telephone DTN instance 140) to forward a request made by a user in a DTN network to a user in a telephone network. The method 700 starts with the reception of a call session (request to make a call) or request to send a message and/or file. At reception, the telephone DTN instance 140 may lookup 710 the destination user details in the database to find 720 a valid match with a valid local user. If a match is found, the telephone DTN instance will treat 730 the call as a local telephone call, using a standard telephone call/message/file transfer procedure. When the destination user is not local, the telephone DTN instance 140 (via for example, a data base lookup) may select a default DTN connector. The telephone DTN instance 140 may determine 750 whether the contact plan details meet the criteria for providing what type of communication with the default DTN connector 120. The telephone DTN instance 140 may evaluate the destination user's contact details for the criteria. For destination user not in contact (not in_contact), for destination user in contact (in_contact) and with a contact duration (contact_duration) less or equal than the minimum contact duration (min_contact_dur) (determination 750), for destination user not within the telephony real time delay limits (telephone_real_time) (determination 770), and for destination user without a real time alternate route (alternate_DTN_real_time_routing) (determination 780), the telephone DTN instance 140 decides to forward 760 the request (and associated media) through the DTN. (a) for messaging requests (for example SMS), the telephone DTN instance 140 replies to the originating user with a message indicating that the original message is expected arrive at destination at a specific day and time of the day and the expected arrival delay. (b) for call requests, the telephone DTN connector connects the call with the originating user and inform the user the conversation will be interactive and asynchronous and indicate the expected arrival day and time at destination and the expected arrival delay and instruct the user to leave the message. In some embodiments, the DTN connector may indicate in a message associated with (telephone_real_time) whether the target recipient will be available in the future, so that users may be provided a future time they can expect to call and have available live telephony. The telephone DTN instance managed DTN instance module then encapsulates the data into a CFDP (CCSDS file delivery protocol) protocol data unit (PDU) or directly into a bundle protocol bundle and send it to the default DTN destination. For destination user in contact (in_contact), and with a contact duration (contact_duration) greater than the minimum contact duration (min_contact_dur) and within the telephony real time delay limits (telephone_real_time) and with a real time alternate route (alternate_DTN_real_time_routing), the telephone DTN instance 140 may send 790 the request (and associated media) through the alternate real_time routing option.

Figure 8A:
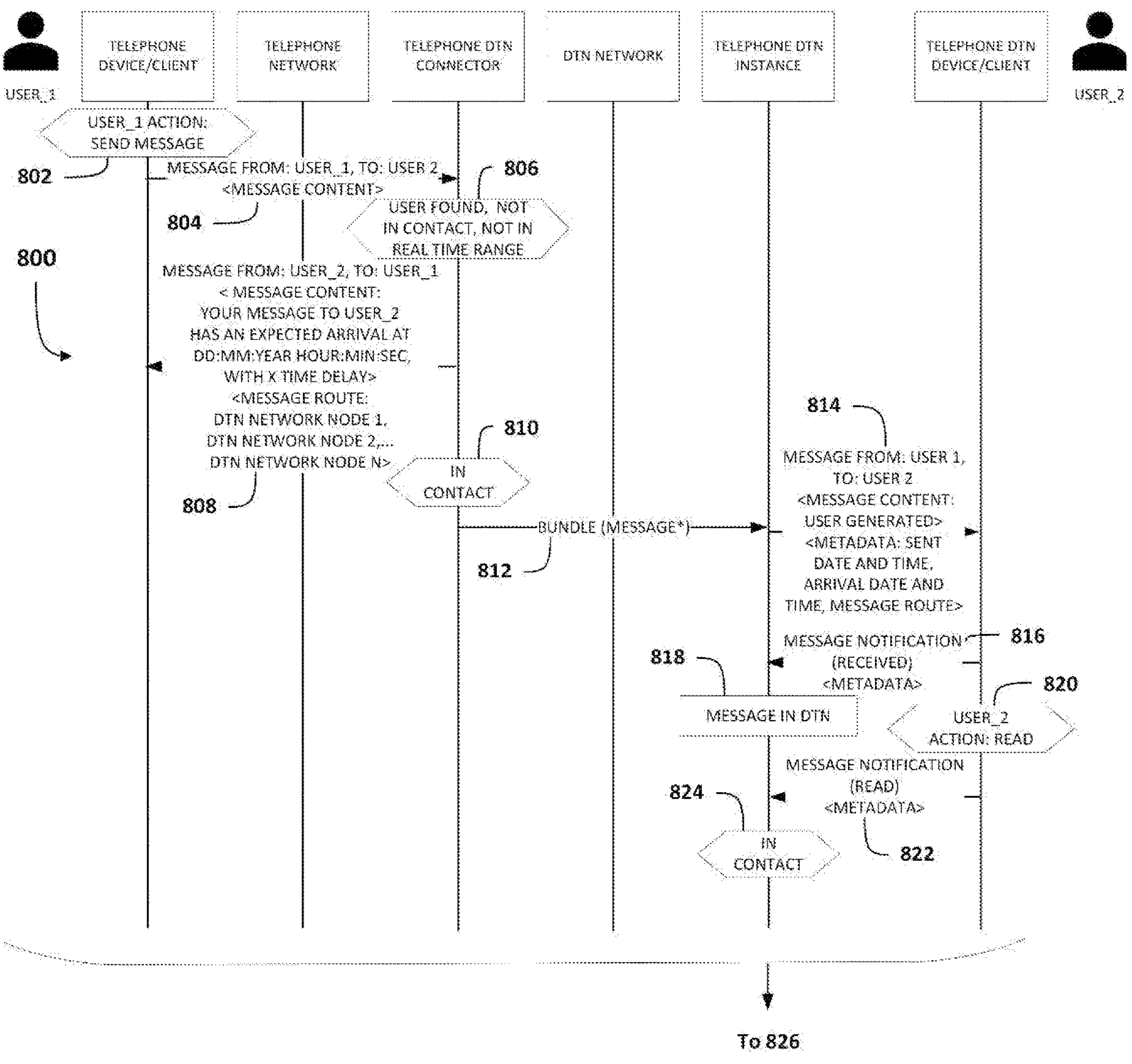
FIGS. 8A and 8B are a transaction diagram of detailed transactions for a user sending a message when connected to the telephone network to a remote user that is connected to the DTN network, and the remote user sending a message back to the user that sent the original message, according to an example embodiment.
Figure 8B:
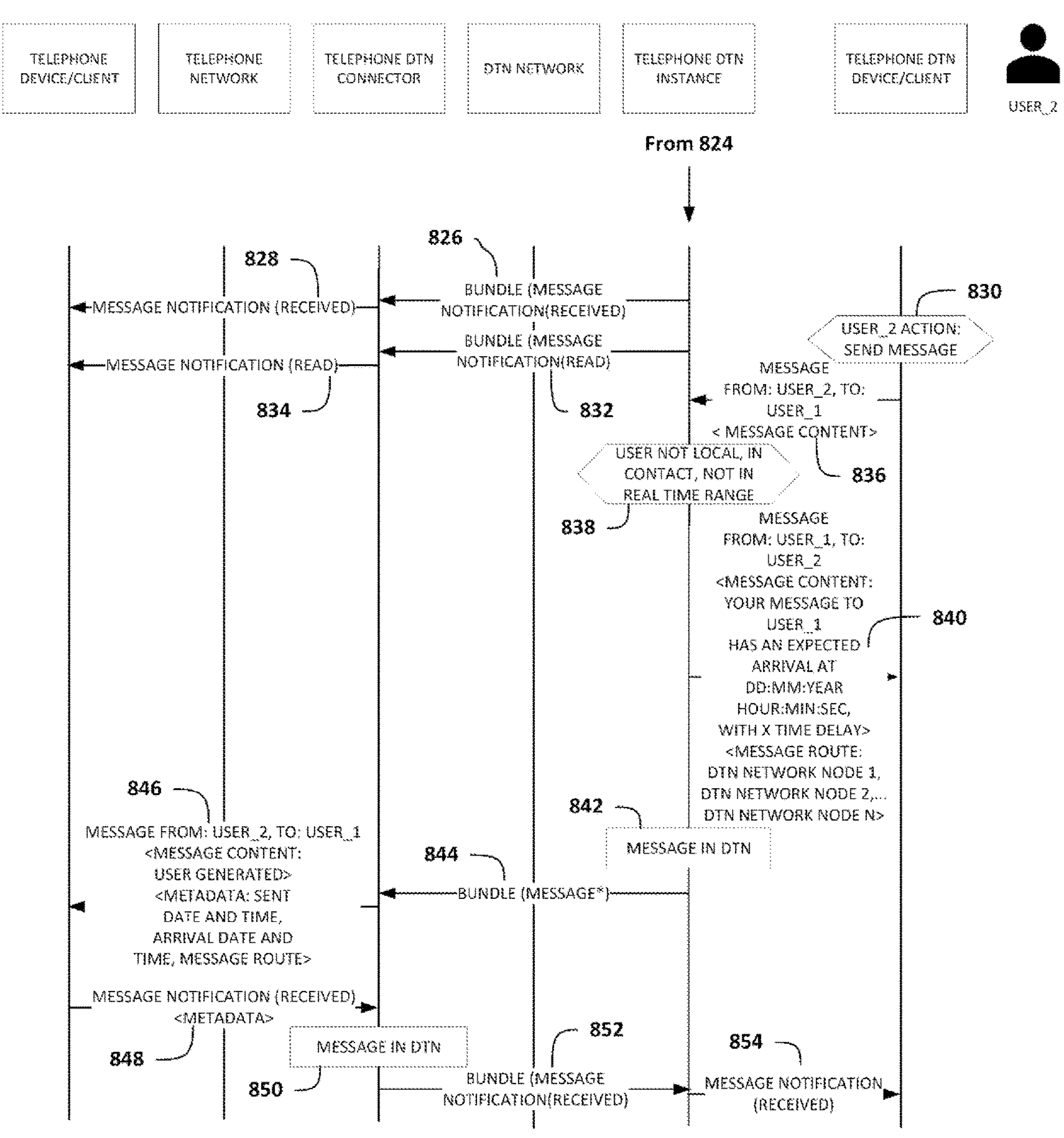

Referring now to FIGS. 8A and 8B, a method 800 is shown illustrating detailed transactions used for sending a message between users. User_1 with a telephone device/client connected to the telephone network attempts to send 802 a text message (send message) 804 to user_2 with a telephone DTN device/client. The telephone/device client (using methods not described here but inclusive of the use of PLMN standard text or multimedia messaging, http/https-based messaging and sip-based messaging) sends the message to the destination user_2 identified by its telephone number. The message reaches the telephone DTN connector (for example, by using a traditional telephone number-based routing performed as the destination telephone number route is registered to the telephone DTN connector). The telephone DTN connector forwards a request made to the user (user_2) in the DTN network, at message reception. The DTN connector may use for example, the method 400 described in FIG. 4. In this example, block 806 represents that the destination user_2 is (not in_contact) (currently unavailable or within communication range). The telephone DTN connector notifies at block 808 the user_1 of the expected arrival day and time of the message to user_2, the expected delay in days, hours, seconds, and the message route, among other metadata. The telephone DTN connector encapsulates the message into a CFDP protocol data unit (or directly) into a bundle protocol bundle(s). Once in contact (in_contact) (represented by block 810), the telephone DTN connector will send 812 the bundle(s) to the destination telephone DTN instance, which will convey the message 814 to the destination telephone DTN device/client, where it can be acted upon by the user_2. Once the message 814 reaches the telephone DTN device/client, a message notification indicating the message has been received (received) can be sent back 816 to the user_1 in the DTN (block 818). Message notifications can be sent also for other user_2 actions including when message is read (user_2 action: message read) (block 820). The message notification 822 may include metadata such as the day and time in which the action that is subject to the notification occurred (for example, when message was read). These message notifications, like any other message that is sent back to user_1 may be received first by the telephone DTN instance 140. The telephone DTN instance may forward the request made by user_2 (in the DTN network) to user_1 in the telephone network (for example, using the method 700 described in FIG. 7). In this example the user_2 sends a notification 822 message back (action: send message) to user_1 which is not local (user not local), is in contact (in_contact) (block 824) but not in real time range (not in real time range). The telephone DTN instance 826 encapsulates the message into a CFDP protocol data unit (or directly) into a bundle protocol bundle(s). As the destination is in contact (in_contact), the telephone DTN instance will send the bundle(s) to the default telephone DTN connector, which will convey it 828 to the telephone network to reach the destination telephone device/client, where it can be acted upon by the user_1. These message notifications include metadata such as the day and time in which the action that is subject to the notification occurred (for example when message was read). Blocks 830 through 854 illustrate an example of the method 400 where user_2 in the DTN network is sending a message to user_1 in a telephone network who is in contact but unavailable to receive the message at the moment of transmission.

Figure 9A:
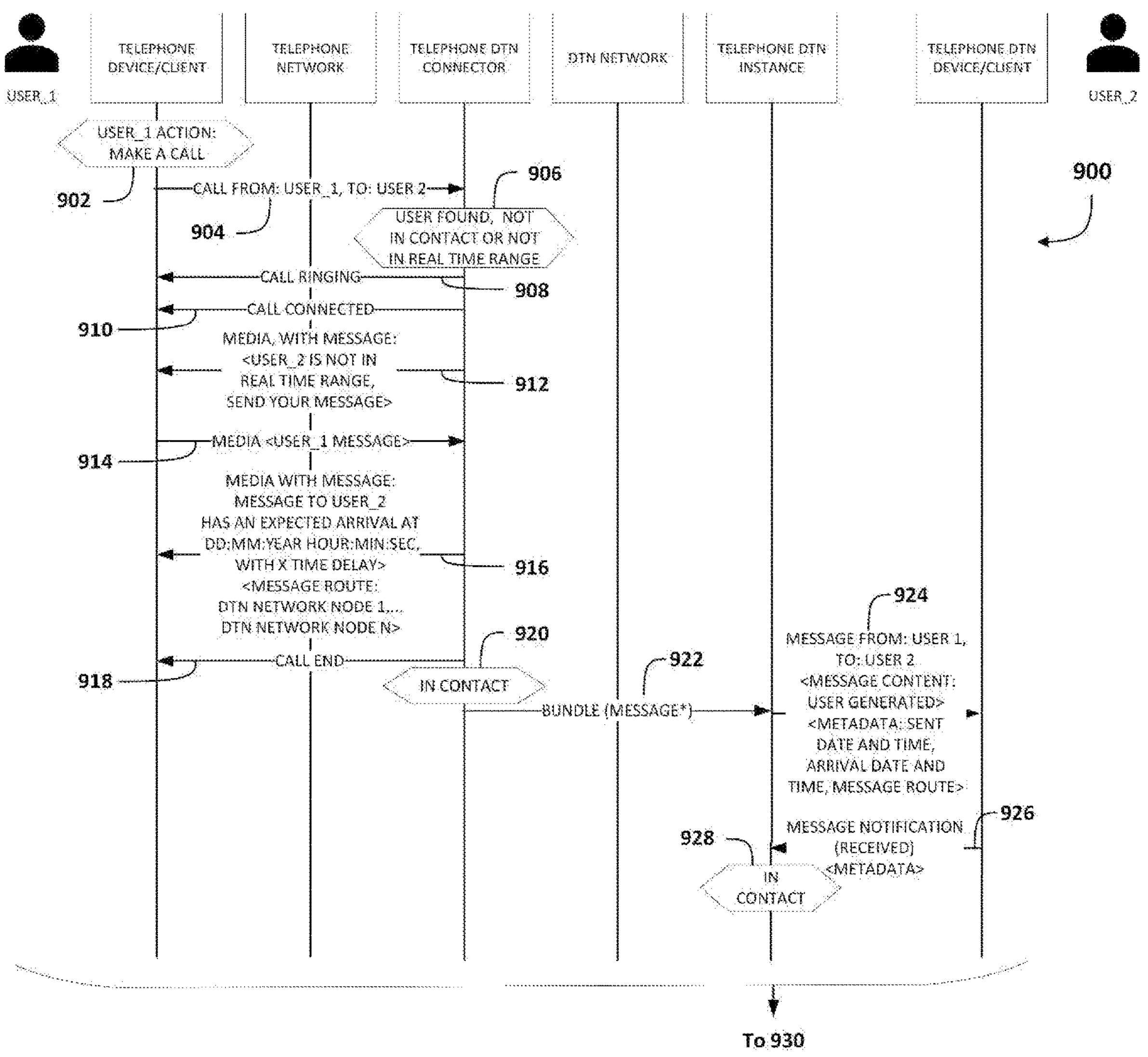
FIGS. 9A and 9B are a transaction diagram of detailed transactions for a user making a telephone call when connected to the telephone network to a remote user that is connected to the DTN network, and the remote user sending a message back to the user that made the original call, according to an example embodiment.
Figure 9B:
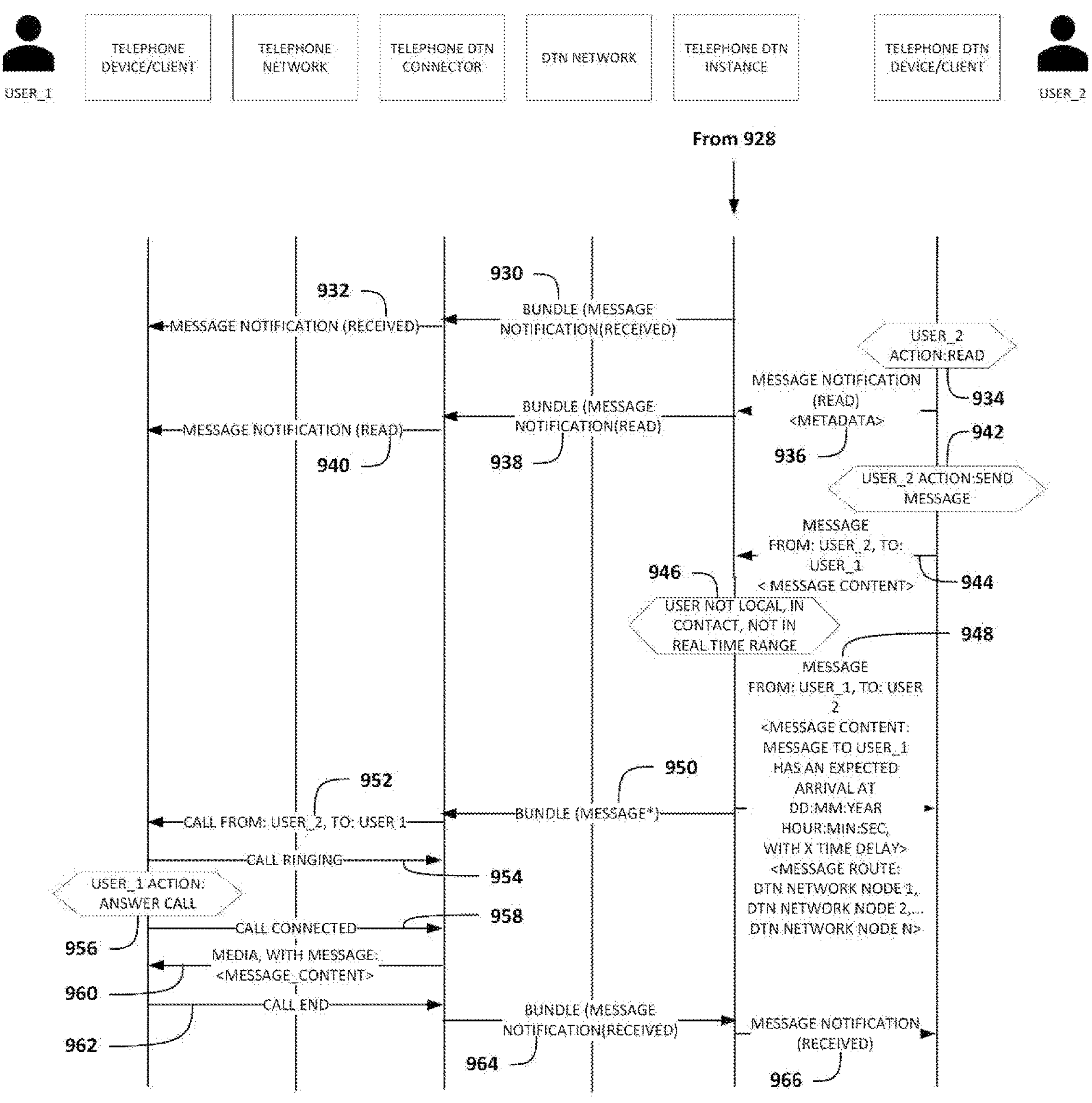

FIGS. 9A and 9B shows a method 900 for having a telephone call interaction between users in a DTN according to an embodiment. User_1 (calling user or first user) with a telephone device/client connected to the telephone network attempts to make 902 a telephone call to user_2 (recipient user or second user) with a telephone DTN device/client. The telephone/device client (using methods not described here but inclusive to the use of PSTN/PLMN standard calling, HTTP/HTTPS-based calling, and SIP-based calling) sends 904 the call request to the destination user_2 identified by its telephone number. The call request reaches the telephone DTN connector (for example, by using telephone number-based routing performed as the destination telephone number route is registered to the telephone DTN connector). The telephone DTN connector forwards a request made to the user (user_2) in the DTN network, at message reception. The DTN connector may use for example, the method 400 described in FIG. 4. In this example, the DTN connector finds the user but the destination user_2 is not in_contact (block 906). The telephone DTN connector proceeds with establishing 908 the call (via call ringing and call connected associated signaling 910) and associated media (audio only or video with audio). The telephone DTN connector notifies 912 the user_1 that user_2 is not in contact or within range (the condition(s) that triggered the actions as defined for example, by method 400 described in FIG. 4). The telephone DTN connector may prompt user_1 to continue the conversation in an asynchronous manner by leaving a message 914 to user_2. The telephone DTN connector will notify 916 user_1 of the expected arrival day and time of this message to user_2, the expected delay in days, hours, seconds, and the message route, among other metadata. In this example, the telephone DTN connector disconnects 918 the call by sending a call end signaling to user_1 telephone device/client. Note that in other scenario embodiments, the user_1 may be the user sending the call end signaling event. The telephone DTN connector encapsulates the message into for example, a CFDP protocol data unit (or directly) into a bundle protocol bundle(s). Once the system identifies that user_2 is in contact (in_contact) (or available or within range), the telephone DTN connector will send 922 the bundle(s) to the destination telephone DTN instance, which will convey 924 the message to the destination telephone DTN device/client, where it can be acted upon by the user_2. Once the message reaches the telephone DTN device/client, a message notification indicating 926 the message has been received (received) can be sent back to the user_1. Message notifications can be sent also for other user_2 actions including when message is read (user_2 action: message read) (block 934). These message notifications include metadata such as the day and time in which the action that is subject to the notification occurred (for example when message was read). These message notifications, like any other message that is sent back to user_1 may be received first by telephone DTN instance which may forward the request made by user_2 (in the DTN network) to user_1 in the telephone network (for example, using the method 700 described in FIG. 7). In this example the user_2 sends a notification 926 message back (action: send message) to user_1 which is not local (user not local), it is in contact (in contact) but not in real time range (not in real time range). The telephone DTN instance encapsulates the message into a CFDP protocol data unit (or directly) into a bundle protocol bundle(s). As the destination is in contact (in_contact) (block 928), the telephone DTN instance will send 930 the bundle(s) to the default telephone DTN connector. The steps represented by numerals 932-950 are similar to the steps 826-834 of FIG. 8 and are not repeated here for sake of avoiding prolixity.

In this example, the telephone DTN connector attempts to establish 952 a telephone call to user_1 telephone device/client via the telephone network (using methods not described here but inclusive to the use of PSTN/PLMN standard calling, HTTP/HTTPS-based calling, and SIP-based calling), where it can be acted upon by the user_1. In this example, the telephone device/client rings (sending a call 954 ringing signaling to the telephone DTN connector through the telephone network) and the user_1 answers the phone call (action: answer call 956) establishing media and the telephone DTN connector delivers the original message 960 contents (audio only or video with audio) to user_1. Once the message content is delivered the user_1 ends the call, and the user_1's telephone device/client sends a call end signaling 962 to the telephone DTN connector. Once the message reaches user_1's telephone device/client, a message notification indicating the message has been received (received) 964 can be sent back from the telephone DTN connector to the user_2. These message notifications include metadata such as the day and time in which the action that is subject to the notification occurred (for example when message was read). These message notifications, like any other message that is sent back to user_2 will be received first 964 by telephone DTN instance which send it back 966 to the telephone DTN device/client for user_2 to act upon.

Figure 10:
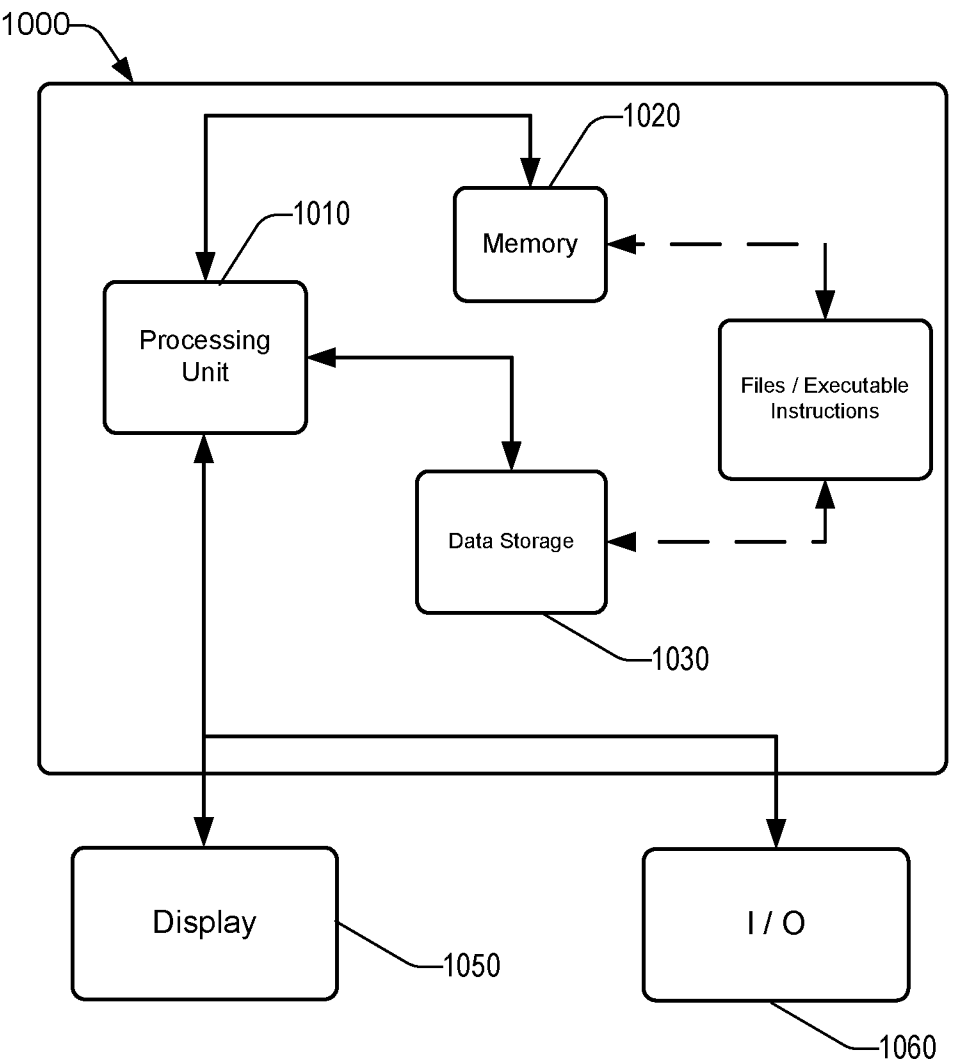
FIG. 10 is a block diagram of a computing device in accordance with embodiments of the subject technology.

Referring now to FIG. 10, a general computing device 1000 is shown according to an exemplary embodiment. It will be understood that a "computing device" may serve different roles depending on the need in the system or depending on the step being performed in a process. For example, in the role of a web server, a host server, or an online platform server that administers the connection of a telephony service to a DTN as a service, a computing device may implement for example the functions related to backend processes (for example, those described with respect to FIGS. 3, 4, 6, and 7 and throughout). In another role, the computing device may be a client device that includes communication functions operated by end users to communicate with one another (for example, devices 160 shown in FIG. 1). In the role of a user device, the computing device 1000 is generally not a server but may instead be desktop computers, tablet or laptop computers, all-in-one computer stations, a mobile computing device (for example, a smart phone, smart wearable devices (glasses, jewelry, watches, ear wear, etc.), smart televisions, smart hubs, robots, or programmable electronics. As will be understood, the end user device may generally provide frontend aspects of the system. In some embodiments however, the frontend computing device may perform one or more of the backend steps where possible.

The components of the computing device may include, but are not limited to, one or more processors or processing units 1010, a system memory 1020, data storage 1030, a computer program product 1040 having a set of program modules including files and executable instructions, and a bus system that couples various system components including the system memory 1020 to the processor(s) 1010. The memory storage 1020 may store for example, user identifiers including for example, telephone numbers, names, IP addresses, DTN bundle protocol endpoint identification numbers or values, etc.).

The computing device 1000 may be described in the general context of computer system executable instructions, such as the program modules which represent a software embodiment of the system and processes described generally above. The program modules generally carry out the functions and/or methodologies of embodiments as described above. The computing device 1000 may typically include a variety of computer system readable media. Such media could be chosen from any available media that is accessible by the computing device 1000, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 1020 could include one or more computer system readable media in the form of volatile memory, such as a random-access memory (RAM) and/or a cache memory. By way of example only, the data storage system 1030 may read from and write to a non-removable, non-volatile magnetic media device. The system memory 1020 may include at least one program product 1040 having a set of program modules that are configured to carry out the functions of embodiments of the invention in the form of computer executable instructions. The program product/utility 1040 may be stored in the system memory 1020 by way of example, and not limitation, one or more application programs, other program modules, and program data. Some embodiments may generate an electronic user interface (viewable and controllable from the display unit 1050) that may allow the user to initiate a call, receive message notifications, enter messages, and receive calls or messages.

The computing device 1000 may communicate with one or more external devices including for example, a peripheral form of the electronic display 1050 which may in some embodiments be configured for tactile response as in a touch screen display. User input into the display 1050 may be registered at the processor 1010 and processed accordingly. Other devices may enable the computing device 1000 to communicate with one or more other computing devices, either by hardwire or wirelessly. Such communication can occur via Input/Output (I/O) interfaces/ports 1060.

The computing device 1000, through the I/O interface/ports 1060, may communicate with one or more networks such as a local area network (LAN), a general wide area network (WAN), and/or a public network (e.g., the Internet, public telephony networks, and DTNs) via a network adapter as is commonly known in the art. Each of the operating system, one or more application programs, other program modules, and program data or some combination thereof, may include an implementation of a networking environment. In some embodiments, the computing device 1000 may be a cloud computing node connected to a cloud computing network. The computing device 1000 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 1050 which may be controlled via direct contact with the display 1050 or via the I/O interfaces 960 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 1010 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer program product for connecting telephony calls to a Delay and/or Disruption Tolerant Network (DTN), the computer program product comprising a non-transitory computer readable storage medium having computer readable program code embodied therewith, the computer readable program code being configured, when executed by a processor, to:

receive a telephony network formatted signal from a telephony network;

identify a telephony protocol being used by the telephony network;

translate the telephony network formatted signal from the telephony protocol to a DTN bundle protocol, wherein the translation includes encapsulating telephony signaling and media from the telephony protocol into DTN bundles by converting the telephony signaling and media into a Consultative Committee for Space Data Systems (CCSDS) File Delivery Protocol (CFDP) protocol data unit (PDU) or directly into a bundle protocol bundle using an interface adapter configured to adapt between the telephony protocol and the DTN bundle protocol, for transmission to a targeted DTN side end device or client;

identify a DTN associated with the targeted DTN end device or client by looking up DTN destination information including a DTN bundle protocol endpoint identification stored in a database;

forward the translated telephony formatted signal from the telephony network to the targeted DTN end device or client; and forward translated DTN formatted signals from the targeted DTN end device or client to a targeted telephony side end device or client in the telephony network.

2. The computer program product of claim 1, wherein the computer readable program code is further configured to:

receive a reply message from the targeted DTN end device or client, wherein the reply message uses the DTN bundle protocol;

translate the reply message from the DTN bundle protocol into the telephony protocol; and forward the translated reply message to the telephony end client in the telephony network.

3. The computer program product of claim 1, wherein the computer readable program code is further configured to:

determine whether the targeted DTN end device or client is unavailable for receipt of the translated telephony formatted signal; and in response to the targeted DTN end device or client being unavailable for receipt of the translated telephony formatted signal, send a status message to the telephony end client in the telephony network, wherein the status message includes a timestamp indicating an expected arrival time at the targeted DTN end device or client, wherein the expected arrival time is determined based on contact schedule information and routing availability.

4. The computer program product of claim 1, wherein the computer readable program code is further configured to:

associate an end user in the DTN with DTN destination information;

include a DTN instance bundle protocol endpoint identification in the DTN destination information; and determine where to forward the translated telephony formatted signal based on using the DTN destination information associated with the end user in the DTN.

5. The computer program product of claim 4, wherein the forwarded translated telephony formatted signal is forwarded based on one or more of a contact schedule, a delay between the telephony end client and the targeted DTN end device or client, and an availability of routing options.

6. The computer program product of claim 1, wherein the computer readable program code is further configured to:

determine whether the targeted telephony side end device or client in the telephony network is unavailable for receipt of one of the translated DTN formatted signals; and in response to the targeted telephony side end device or client being unavailable for receipt of one of the translated DTN formatted signals, send a status message to the targeted DTN end device or client, wherein the status message includes a timestamp indicating when one of the translated DTN formatted signals will be deliverable the telephony end client.

7. The computer program product of claim 6, wherein the computer readable program code is further configured to convert the one of the translated DTN formatted signals into a bundled message using a Consultative Committee for Space Data Systems (CCSDS) File Delivery Protocol (CFDP), prior to the translated DTN formatted signal being delivered to the telephony end client.

8. A method for connecting telephony calls to a Delay and/or Disruption Tolerant Network (DTN), comprising:

receiving a telephony network formatted signal from a telephony network;

identifying a telephony protocol being used by the telephony network;

translating the telephony network formatted signal from the telephony protocol to a DTN bundle protocol, wherein the translating includes encapsulating telephony signaling and media from the telephony protocol into DTN bundles by converting the telephony signaling and media into a Consultative Committee for Space Data Systems (CCSDS) File Delivery Protocol (CFDP) protocol data unit (PDU) or directly into a bundle protocol bundle using an interface adapter configured to adapt between the telephony protocol and the DTN bundle protocol, for transmission to a targeted DTN side end device or client;

identifying a DTN associated with the targeted DTN end device or client by looking up DTN destination information including a DTN bundle protocol endpoint identification stored in a database;

forwarding the translated telephony formatted signal from the telephony network to the targeted DTN end device or client; and forwarding translated DTN formatted signals from the targeted DTN end device or client to a targeted telephony side end device or client in the telephony network.

9. The method of claim 8, further comprising:

receiving a reply message from the targeted DTN end device or client, wherein the reply message uses the DTN bundle protocol;

translating the reply message from the DTN bundle protocol into the telephony protocol; and forwarding the translated reply message to the telephony end client in the telephony network.

10. The method of claim 8, further comprising:

determining whether the targeted DTN end device or client is unavailable for receipt of the translated telephony formatted signal; and in response to the targeted DTN end device or client being unavailable for receipt of the translated telephony formatted signal, sending a status message to the telephony end client in the telephony network, wherein the status message includes a timestamp indicating an expected arrival time at the targeted DTN end device or client, wherein the expected arrival time is determined based on contact schedule information and routing availability.

11. The method of claim 8, further comprising:

associating an end user in the DTN with DTN destination information;

including a DTN instance bundle protocol endpoint identification in the DTN destination information; and determining where to forward the translated telephony formatted signal based on using the DTN destination information associated with the end user in the DTN.

12. The method of claim 11, wherein the forwarded translated telephony formatted signal is forwarded based on one or more of a contact schedule, a delay between the telephony end client and the targeted DTN end device or client, and an availability of routing options.

13. The method of claim 8, further comprising:

determining whether the targeted telephony side end device or client in the telephony network is unavailable for receipt of one of the translated DTN formatted signals; and in response to the targeted telephony side end device or client being unavailable for receipt of one of the translated DTN formatted signals, sending a status message to the targeted DTN end device or client, wherein the status message includes a timestamp indicating when one of the translated DTN formatted signals will be deliverable the telephony end client.

14. The method of claim 13, further comprising converting the one of the translated DTN formatted signals into a bundled message using a Consultative Committee for Space Data Systems (CCSDS) File Delivery Protocol (CFDP), prior to the translated DTN formatted signal being delivered to the telephony end client.

15. A computer server for connecting telephony users through a Delay and/or Disruption Tolerant Network (DTN), comprising:

one or more network connections;

one or more computer readable storage media;

a processor coupled to the one or more network connections and coupled to the one or more computer readable storage media; and a computer program product comprising program instructions collectively stored on the one or more computer readable storage media, the program instructions comprising:

receiving a telephony network formatted signal from a telephony network;

identifying a telephony protocol being used by the telephony network;

translating the telephony network formatted signal from the telephony protocol to a DTN bundle protocol, wherein the translating includes encapsulating telephony signaling and media from the telephony protocol into DTN bundles by converting the telephony signaling and media into a Consultative Committee for Space Data Systems (CCSDS) File Delivery Protocol (CFDP) protocol data unit (PDU) or directly into a bundle protocol bundle using an interface adapter configured to adapt between the telephony protocol and the DTN bundle protocol, for transmission to a targeted DTN side end device or client;

identifying a DTN associated with the targeted DTN end device or client by looking up DTN destination information including a DTN bundle protocol endpoint identification stored in a database;

forwarding the translated telephony formatted signal from the telephony network to the targeted DTN end device or client; and forwarding translated DTN formatted signals from the targeted DTN end device or client to a targeted telephony side end device or client in the telephony network.

16. The computer server of claim 15, wherein the program instructions further comprise:

receiving a reply message from the targeted DTN end device or client, wherein the reply message uses the DTN bundle protocol;

translating the reply message from the DTN bundle protocol into the telephony protocol; and forwarding the translated reply message to the telephony end client in the telephony network.

17. The computer server of claim 15, wherein the program instructions further comprise:

determining whether the targeted DTN end device or client is unavailable for receipt of the translated telephony formatted signal; and in response to the targeted DTN end device or client being unavailable for receipt of the translated telephony formatted signal, sending a status message to the telephony end client in the telephony network, wherein the status message includes a timestamp indicating an expected arrival time at the targeted DTN end device or client, wherein the expected arrival time is determined based on contact schedule information and routing availability.

18. The computer server of claim 15, wherein the program instructions further comprise:

associating an end user in the DTN with DTN destination information;

including a DTN instance bundle protocol endpoint identification in the DTN destination information; and determining where to forward the translated telephony formatted signal based on using the DTN destination information associated with the end user in the DTN.

19. The computer server of claim 15, wherein the program instructions further comprise:

determining whether the targeted telephony side end device or client in the telephony network is unavailable for receipt of one of the translated DTN formatted signals; and in response to the targeted telephony side end device or client being unavailable for receipt of one of the translated DTN formatted signals, sending a status message to the targeted DTN end device or client, wherein the status message includes a timestamp indicating when one of the translated DTN formatted signals will be deliverable the telephony end client.

20. The computer server of claim 19, wherein the program instructions further comprise converting the one of the translated DTN formatted signals into a bundled message using a Consultative Committee for Space Data Systems (CCSDS) File Delivery Protocol (CFDP), prior to the translated DTN formatted signal being delivered to the telephony end client.

* * * * *